United States Patent [19]

Schwarze

[11] Patent Number: 4,696,389
[45] Date of Patent: Sep. 29, 1987

[54] MOUNTING FOR A CONVEYER BELT SCRAPER ASSEMBLY

[75] Inventor: Hans-Otto Schwarze, Recklinghausen, Fed. Rep. of Germany

[73] Assignee: Hosch-Fordertechnik GmbH, Recklinghausen, Fed. Rep. of Germany

[21] Appl. No.: 605,414

[22] Filed: Apr. 30, 1984

[51] Int. Cl.⁴ .................................................. B65G 45/00
[52] U.S. Cl. ................................................................ 198/499
[58] Field of Search ........................ 198/497, 498, 499; 15/256.5

[56] References Cited

U.S. PATENT DOCUMENTS 3,631,968  1/1972  Ward ..................................... 198/499
4,359,150  11/1982  Bowman et al. ..................... 198/497

FOREIGN PATENT DOCUMENTS 0094021  11/1983  European Pat. Off. ............ 198/499
2709714  9/1978  Fed. Rep. of Germany ...... 198/497
1553210  9/1979  United Kingdom ................. 198/499

*Primary Examiner*—Joseph E. Valenza
*Assistant Examiner*—D. Glenn Dayoan
*Attorney, Agent, or Firm*—Reed Smith Shaw & McClay

[57] ABSTRACT

The invention provides for a mounting for a belt scraper assembly to permit displacement of the assembly when the belt executes a reverse movement. It includes a pivoted lever arm arrangement whereby the assembly can execute an arcuate movement during reverse movement of the belt. It further includes torque storage means which maintains the scraper in contact with the belt and resists arcuate displacement of the assembly.

8 Claims, 6 Drawing Figures

MOUNTING FOR A CONVEYER BELT SCRAPER ASSEMBLY

This invention relates to a mounting for a conveyor belt scraper assembly. More particularly the invention relates to a belt scraper assembly to permit displacement of the assembly when the belt executes a reverse movement.

According to the invention there is provided a mounting for a belt scraper assembly to permit displacement of the assembly when the belt executes a reverse movement, the mounting including means adapted to permit the assembly to execute an arcuate movement during reversal of the belt movement and further including torque storage means adapted to apply pressure to the assembly to track the belt and to resist arcuate displacement of the belt assembly.

The means adapted to permit the assembly to execute an arcuate movement during reversal of the belt may include a lever arm having at its one end a formation in which a shaft supporting the blade assembly may be secured, and being pivotally mounted at its other end so that the lever arm can execute an arcuate movement about its pivotal mounting.

The formation for securing the shaft of the blade assembly may be of annular configuration so as to receive the shaft therein. Screw-threaded bolts may be provided to be screwed through the annular formation onto the shaft to secure the shaft therein.

The torque storage means may include a shaft of angular cross-section mounted within an angular sleeve with pads of elastic material, such as natural or synthetic rubber, interposed between the shaft and the sleve. Thus, when the shaft is turned inside the sleeve, the elastic pads are compressed, thereby storing torque tending to return the shaft to a neutral position.

Alternatively, the torque storage means may comprise a spring, e.g. a lever spring, or torque spring.

The torque storage means may be provided at the pivotally mounted end of the lever arm. Thereby the torque stored in the torque storage means may be transmitted through the lever arm to the scraper assembly.

The torque stored in the torque storage means may have a predetermined value of a sufficient magnitude to ensure that the blade assembly is only arcuately displaced when the belt reverses its direction. The torque storage means may for example be pre-stressed so that the stored torque is equivalent to at least double the mass of the scraper assembly together with material which may be adhering thereto.

The pre-stressing of the torque storage means may be variable in order to provide for different scraper assemblies for different belt widths. The variable pre-stressing may be achieved by varying the characteristics of the assembly, eg. by varying the length of the angular sleeve and pads of elastic material and of the angular shaft mounted therein. In order to store the torque when the torque storage means is pre-stressed, a removable and adjustable stop may be provided for adjusting and limiting the arcuate travel of the lever arm.

The mounting may further include a sleeve to which the torque storage means may be secured. By means of the sleeve, the mounting may be fitted in an operating position. It may for example be fitted by sliding the sleeve over a shaft and screwing nuts onto the shaft against each axial end of the sleeve.

The lever arm may be adapted to execute an arcuate movement through about 55°. However, to pre-stress the torque storage means the lever arm may be displaced from its neutral position through about 25° and the adjustable stop may then be placed in the desired position.

The invention is now described with reference to the accompanying drawings in which.

Figure 1:
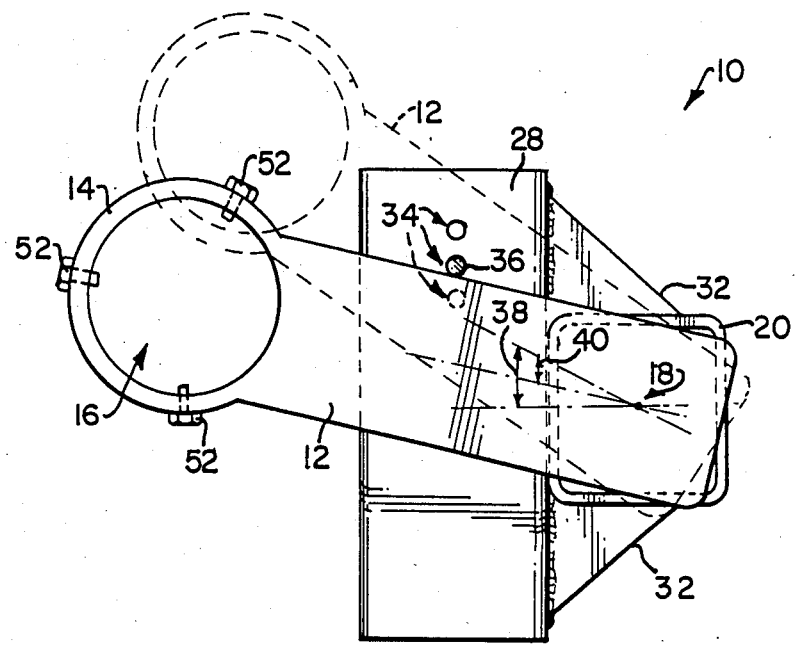
FIG. 1 shows a side view of a mounting for a belt scraper assembly in accordance with the invention.
Figure 2:
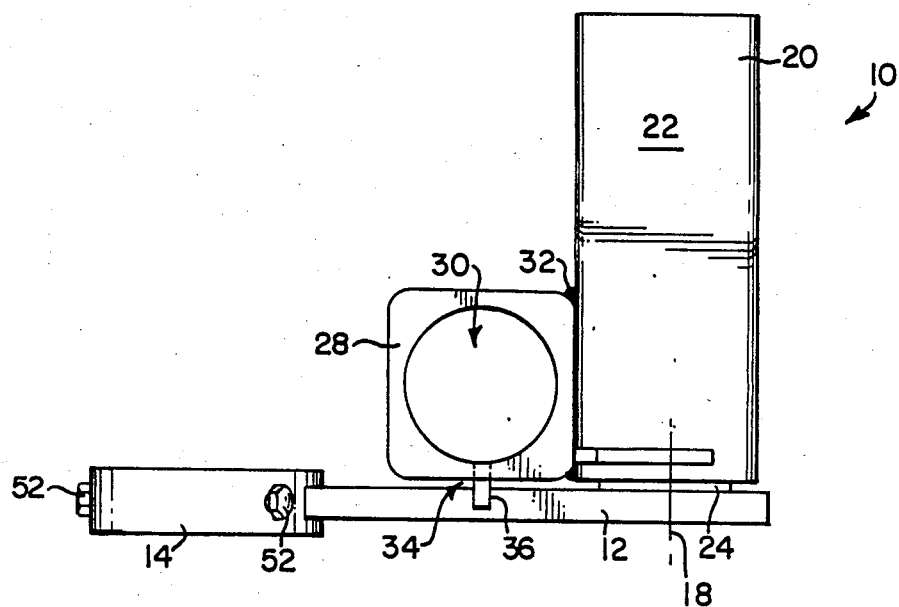
FIG. 2 shows a plan view of the mounting shown in FIG. 1.
Figure 3:
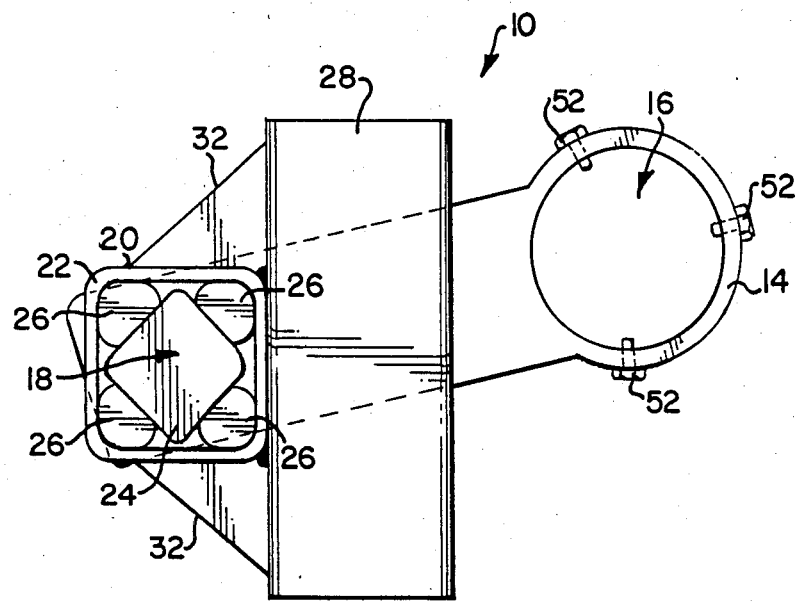
FIG. 3 shows a rear side view of the mounting shown in FIG. 1.

Referring to FIGS. 1, 2 and 3 of the drawings, reference numeral 10 indicates the mounting in general. It comprises a lever arm 12 which has at its one end an annular formation 14 defining an aperture 16. At its other end, the lever arm 12 is mounted to pivot around a pivotal axis 18.

The mounting 10 further includes a torque storage means 20 which comprises a sleeve 22 of square cross-section. It further includes a shaft 24 of square cross section mounted inside the sleeve 22 by means of four pads 26 of an elastic material such as natural or synthetic rubber interposed between the sleeve 22 and the shaft 24. When the shaft 24 is turned, the pads 26 are compressed and thereby torque is generated which resists the rotation of the shaft 24 and tends to return it to a neutral position.

The mounting 10 further includes a sleeve 28 having a bore 30. The sleeve 22 of the torque storage means 20 is secured to the sleeve 28 by means of an attachment 32, for example in the form of welding, with or without a gusset. The sleeve 28 has a hole 34 into which a stop in the form of a pin 36 can be removably inserted. The position of the pin 36 may be adjustable eg by having multiple holes 34, or by having a screw arrangement (not shown).

Referring further to FIG. 1, the lever arm 12 is shown in dotted lines in its neutral position. It can be displaced through an angle 38 from its neutral position, and this angle is about 55°. In order to pre-stress the torque storage means 20 the lever arm 12 is displaced from its neutral position through an angle 40 which may be about 25°, and the stop 36 is then inserted in the desired hole 34 to retain the lever arm in this position. The amount by which the torque storage means 20 is pre-stressed is equal to at least double the mass of the belt scraper assembly shown in FIG. 4 together with any material adhering to the scraper assembly. This ensures that the torque storage means generates sufficient pressure to ensure that the belt scraper assembly tracks the belt and further ensures that the assembly will only be arcuately displaced via the arcuate displacement of the lever arm 12 when the belt is reversed. When the mounting 10 is thus pre-stressed, it is ready for installation in its operating position as shown in FIGS. 4 and 5.

Figure 4:
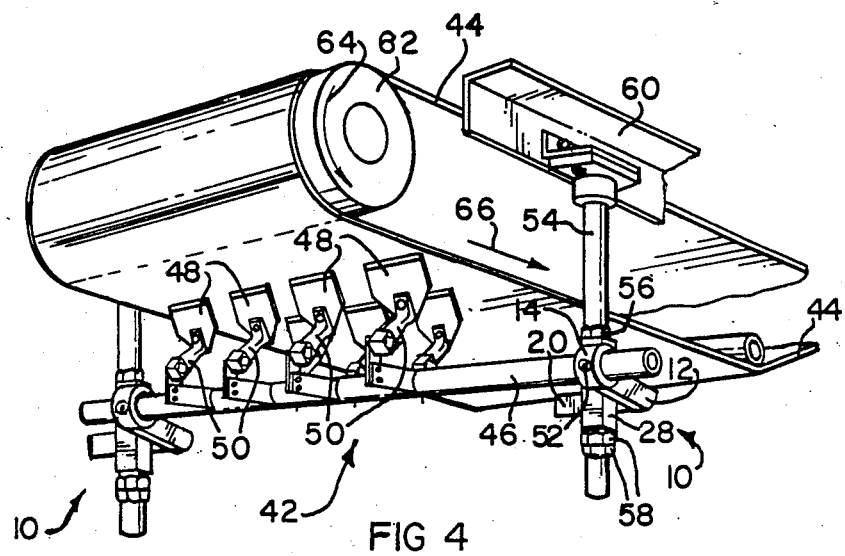
FIG. 4 shows a three dimensional view of the mounting shown in FIG. 1 fitted in an operating position on a belt scraper assembly.
Figure 5:
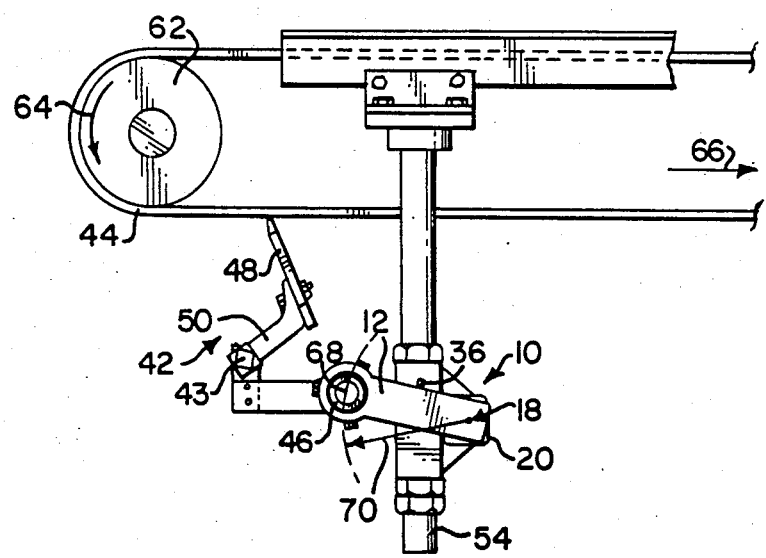
FIG. 5 shows a side view of the mounting and scraper assembly of FIG. 4.

Referring to FIGS. 4 and 5, the mounting 10 is shown installed in its operating position on a belt scraper assembly 42 so that the assembly can track and scrape a belt 44. The assembly 42 includes a mounting shaft 46 and a plurality of scraping blades 48 mounted via pivotal linkages 50 on the shaft 46. The shaft 46 extends through the annular formation 14 of the lever arm 12 of the mounting 10. The annular formation 14 is clamped to the shaft 46 by means of clamping screws 52. The mounting 10 is fitted on its operating position by means of a screw-threaded shaft 54 which extends through the bore 30 of the sleeve 28. The sleeve 28 is secured in an axial position on the shaft 54 by means of locknuts 56 and 58. The shaft 54 is secured to a frame assembly 60.

During normal operation the belt drum 62 rotates in the direction of arrow 64 and the belt 44 is driven in the direction of arrow 66. The scraper assembly 42 tracks the belt 44 by means of the torque stored in the torque storage means 20 of the mounting 10. By referring to FIG. 5, it will be clear that the scraper assembly 42 can thus be arcuately displaced along an arcuate path 68 about the pivotal axis 18 of the lever arm 12, the radius of the arcuate path 68 being indicated by reference numeral 70.

Figure 6:
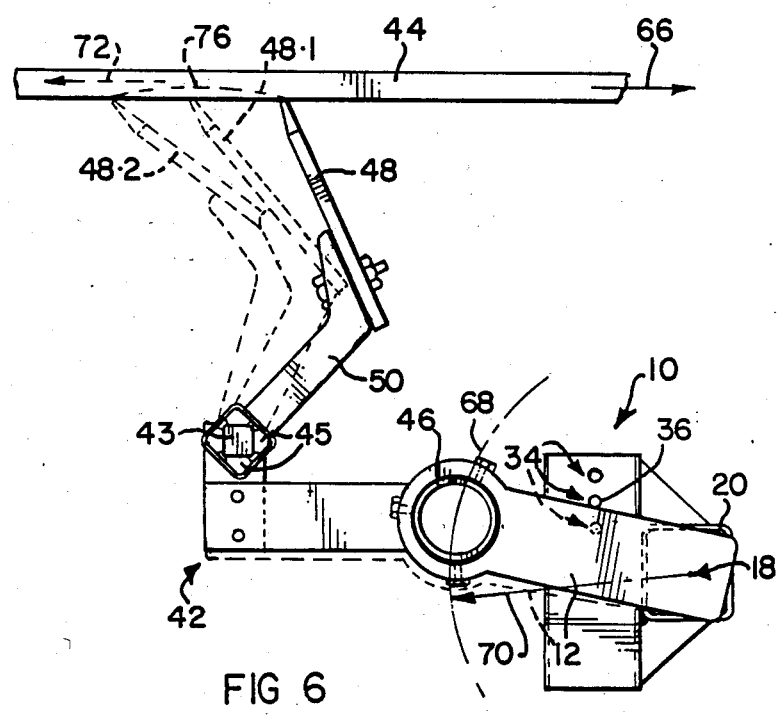
FIG. 6 shows on an enlarged scale the movement executed by a blade on the scraper assembly of FIGS. 4 and 5 during reversal of the movement of the belt.

Referring further to FIG. 5 and also to FIG. 6, when the belt 44 is reversed so as to move in the direction 72, the blade 48 on the scraper assembly 42 has to pivot about a pivotal shaft 43 against torque stored in resilient pads 45 to move from the position shown in solid lines through the intermediate position 48.1 to its final position 48.2 along path 76. In order to execute this movement, the blade 48, especially when it is in the intermediate position 48.1 is displaced downwardly, thereby causing th entire assembly 42 and the mounting shaft 46 and the lever arm 12 to pivot downwardly along the arcuate path 68 about the pivotal axis 18 as indicated by the dotted lines 42 and 12. This arcuate movement is executed against the torque stored in the torque storage means 20 and after the movement has been executed, the stored torque in 20 together with the torque stored in 45 continues to exert sufficient pressure to ensure that the blades 48 are pressed against the belt 44 to thereby continue to track the belt.

I claim:

1. A mounting for a belt scraper assembly including displacement means adapted to permit arcuate displacement of the assembly when the belt executes a reverse movement, said displacement means comprising a lever arm having at its one end a formation in which a mounting shaft supporting a blade assembly is secured, said blade assembly including a first pivotal mounting permitting said blade assembly to be pivotally mounted to said mounting shaft, said first pivotal mounting including a first torque storage means permitting the blade assembly to execute an arcuate movement about the first pivotal mounting; said lever arm being pivotally mounted at its other end to a support shaft via a second pivotal mounting, said second pivotal mounting including a second torque storage means permitting the lever arm to execute an arcuate movement about the second pivotal mounting; said second torque storage means adapted to apply pressure to the belt assembly to track the belt and resist arcuate displacement of the belt assembly, said second torque storage means comprising a shaft of angular cross-section mounted within an angular sleeve with plural pads of elastic material interposed between the shaft and the sleeve, the torque stored in the second torque storage means having a predetermined value of a sufficient magnitude to ensure that the blade assembly is only arcuately displaced when the belt reverses its direction; said mounting further including an adjustable stop for adjusting and limiting the arcuate travel of the lever arm in the direction toward the belt.

2. A mounting as claimed in claim 1, in which the formation for securing the mounting shaft of the blade assembly to the lever arm is of annular configuration so as to receive the mounting shaft therein.

3. A mounting as claimed in claim 1, in which the first torque storage means includes a shaft of angular cross-section mounted within an angular sleeve with pads of elastic material interposed between the shaft and the sleeve.

4. A mounting as claimed in claim 1, in which the second torque storage means is adapted to be pre-stressed.

5. A mounting as claimed in claim 4, in which the second torque storage means is pre-stressed so that the stored torque is equivalent to at least double the mass of the scraper assmebly together with material which may be adhering thereto.

6. A mounting as claimed in claim 4, in which the pre-stressing of the second torque storage means can be varied.

7. a mounting as claimed in claim 6, in which the pre-stressing of the second torque storage means is variable by varying the length of the angular sleeve, the angular shaft, and the elastic pads disposed therebetween.

8. A mounting as claimed in claim 1, which includes a sleeve to which the second torque storage means may be secured for fitting the mounting in an operating position.

* * * * *